United States Patent
Beierl (10) Patent No.: US 11,541,949 B2
(45) Date of Patent: Jan. 3, 2023

(54) REAR DIFFUSER FOR A MOTOR VEHICLE

(71) Applicant: Dr. Ing. h.c. F. Porsche Aktiengesellschaft, Stuttgart (DE)

(72) Inventor: Dominik Beierl, Korntal-Münchingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 44 days.

(21) Appl. No.: 17/356,746

(22) Filed: Jun. 24, 2021

(65) Prior Publication Data

US 2021/0403102 A1  Dec. 30, 2021

(30) Foreign Application Priority Data

Jun. 25, 2020  (DE) .................... 10 2020 116 754.7

(51) Int. Cl.
*B62D 35/00* (2006.01)
*B62D 35/02* (2006.01)

(52) U.S. Cl.
CPC .......... *B62D 35/007* (2013.01); *B62D 35/02* (2013.01)

(58) Field of Classification Search
CPC .............................. B62D 35/007; B62D 35/02
USPC ............................................ 296/180.3, 180.5
See application file for complete search history.

(56) References Cited

U.S. PATENT DOCUMENTS

| | | | |
|---|---|---|---|
| 9,283,999 B2 | 3/2016 | Wolf et al. | |
| 10,040,493 B2* | 8/2018 | Wolf | ....................... F15D 1/007 |
| 10,676,140 B2 | 6/2020 | Wolf et al. | |
| 2015/0232138 A1* | 8/2015 | Parry-Williams | .... B62D 35/005 |
| | | | 296/180.5 |
| 2015/0353148 A1* | 12/2015 | Wolf | ..................... B62D 35/007 |
| | | | 296/180.5 |
| 2015/0353149 A1* | 12/2015 | Wolf | ..................... B62D 35/007 |
| | | | 296/180.5 |
| 2019/0009841 A1* | 1/2019 | Wolf | ..................... B62D 35/007 |

FOREIGN PATENT DOCUMENTS

| | | | |
|---|---|---|---|
| DE | 3011652 A1 | 10/1981 | |
| DE | 102013105842 A1 | 12/2014 | |
| DE | 102014110199 A1 * | 1/2016 | ........... B62D 35/005 |
| DE | 102015116343 A1 | 3/2017 | |
| DE | 102015118076 A1 * | 4/2017 | ........... B62D 35/007 |
| DE | 102017104913 A1 | 9/2018 | |
| DE | 102017114863 A1 | 1/2019 | |

* cited by examiner

*Primary Examiner* — Jason S Daniels
(74) *Attorney, Agent, or Firm* — RatnerPrestia (57) ABSTRACT

A rear diffuser on the underbody of a motor vehicle having an air duct which extends at the rear of the motor vehicle counter to the longitudinal direction of the vehicle toward the rear end of the motor vehicle. The air duct has at least one upper wall, which delimits the air duct in the upward direction. The upper wall has a first region, which is coupled in a nonadjustable manner to the motor vehicle and/or to the underbody. The upper wall has a second region, which can be moved relative to the motor vehicle and/or to the underbody. The second region is coupled in a movable manner to the first region by at least one hinge-type region.

11 Claims, 6 Drawing Sheets

REAR DIFFUSER FOR A MOTOR VEHICLE

CROSS-REFERENCE TO RELATED APPLICATION

This application claims priority to German Patent Application No. 102020116754.7, filed Jun. 25, 2020, the content of such application being incorporated by reference herein in its entirety.

FIELD OF THE INVENTION

The invention relates to a rear diffuser for a motor vehicle and to a motor vehicle having such a rear diffuser.

BACKGROUND OF THE INVENTION

Motor vehicles have an underbody which is typically indented and makes a not inconsiderable contribution to drag. There are also known rear diffusers which are formed at the rear of the motor vehicle and form an air duct whose cross section widens upward counter to the direction of travel of the motor vehicle, that is to say toward the rear of the motor vehicle, in order to assign more cross-sectional area to the air flow through the air duct, reducing the air velocity in the air duct and thus generating a vacuum in the region of the underbody with respect to the roadway, which means an increased downforce on the motor vehicle. Rear diffusers of this type are now frequently encountered in motor vehicles for racing because higher cornering speeds can thereby be achieved with a higher downforce. However, such a rear diffuser also always entails increased drag, which can also be disadvantageous at high driving speeds, e.g. on a straight section of the race track. The design of the rear diffuser in a motor vehicle for racing therefore also depends on the profile of the race track on which the motor vehicle is to be moved, in particular on the proportion of bends on the overall race track compared with the proportion of regions which can be driven at high speed or at maximum speed.

In motor vehicles for everyday use, a known rear diffuser is designed to be nonadjustable and is used mostly to provide downforce for the motor vehicle and is also evaluated according to optical standards. Thus, it is found that, although the rear diffuser on a motor vehicle for everyday use makes a contribution to the downforce, it also increases drag, especially if the increased downforce is not required or desired, which also has a negative effect on fuel consumption.

DE 10 2013 105 842 A1, which is incorporated herein by reference, discloses a foldable rear diffuser with which it is found that, as a result of the folding operation by means of a hinge, the air flow does not follow the angled folding surface well, and therefore the effect on the reduction in drag is only slight.

SUMMARY OF THE INVENTION

Described herein is a rear diffuser which, when required, permits an improved downforce on the motor vehicle and likewise, when required, gives rise to improved reduced drag. It is also the object to provide a motor vehicle having a rear diffuser which, when required, permits an improved downforce on the motor vehicle and likewise, when required, gives rise to improved reduced drag.

An exemplary embodiment of the invention relates to a rear diffuser on the underbody of a motor vehicle, having an air duct which extends at the rear of the motor vehicle counter to the longitudinal direction of the vehicle toward the rear end of the motor vehicle, wherein the air duct has at least one upper wall, which delimits the air duct in the upward direction, wherein the upper wall has a first region, which is coupled in a nonadjustable manner to the motor vehicle and/or to the underbody, and wherein the upper wall has a second region, which can be moved relative to the motor vehicle and/or to the underbody, wherein the second region is coupled in a movable manner to the first region by means of at least one hinge-type region. In this case, it is advantageous that the movability allows the rear diffuser to be set to a first operating position with a high downforce and to a second operating position with a low drag in order to be able to allow for the various driving operating conditions and fuel consumption.

In this case, the air duct can optionally be delimited laterally by substantially vertically extending walls in order to bring about a defined flow through the air duct across the width. Here, the second region is advantageously arranged within the air duct, between the walls. However, such vertically extending walls are also not necessary, in which case the air duct under the motor vehicle is formed between the upper wall and the roadway.

It is particularly advantageous if the second region extends toward the rear end, that is to say the rear end of the body, of the motor vehicle and has at least one laminar element. The laminar element serves as a rigid upper boundary of the air duct and serves to determine the height of the air duct and the air guidance within the air duct.

It is also advantageous in one exemplary embodiment if the second region furthermore has a wall which projects from the laminar element and projects upward from the laminar element. Thus, both in the first operating position with a high downforce and in the second operating position with a low drag, a closed termination of the second region with respect to the body or the bumper cover is achieved.

It is also advantageous if the second region furthermore has a spoiler lip, which projects from the laminar element and/or from the projecting wall and projects substantially counter to the direction of travel. This furthermore brings about favorable air flow downstream of the motor vehicle, which, in particular, causes favorable turbulence of the air downstream of the motor vehicle.

It is also expedient, in the case of another exemplary embodiment, if the hinge-type region is formed by a flexible surface element, which connects the first region to the second region, in particular connects a rigidly formed laminar element of the first region to a rigidly formed laminar element of the second region. Thus, the flexible laminar element produces a desired convexity between the rather rigid laminar regions in order to produce a predefined curvature which is particularly favorable for the air flow in the region of the hinge-type region. This is particularly advantageous in comparison with hinges that have a single hinge axis because these known individual hinges permit only two regions connected thereto to be angled. Such an angle cannot be followed in an ideal way by an air flow, leading to increased drag.

It is particularly advantageous if the flexible surface element is formed as films or a mat made of a rubber material or of an elastomer material. Thus, it can be used simultaneously as a hinge element and as an air guiding region, which can adapt to a predefined curvature and thus can guide the air flow in a favorable way.

Alternatively, it is also advantageous if the hinge-type region is formed by a plurality of hinges which, with the interposition of respective intermediate elements, connect the first region to the second region, wherein the hinges are arranged in a chain arrangement with respect to one another. This also makes it possible for the hinge-type region to extend in a laminar manner and to be able to adapt to a predefined curvature in order to configure the guidance of the air in a favorable way.

Thus, it is advantageous if a first intermediate element is connected in an articulated manner to the first region by means of a first hinge, and the second region is connected in an articulated manner to the first intermediate element or to a second intermediate element by means of a second hinge, wherein at least one third hinge and/or at least one third hinge, at least one third intermediate region and at least one fourth hinge are/is optionally arranged between the first intermediate region and the second intermediate region. This makes it possible to create a laminar region of the hinge-type element which nevertheless has a stable configuration and a defined deformability.

It is expedient if the laminar element of the second region can be adjusted by means of an actuator between a retracted, raised operating position and an extended, lowered operating position. As a result, the rear diffuser can be adjusted automatically and/or manually, thus enabling it to be adapted to the current driving situation of the motor vehicle.

One exemplary embodiment of the invention relates to a motor vehicle having a rear diffuser according to aspects of the invention.

BRIEF DESCRIPTION OF THE DRAWING FIGURES

The invention is explained in detail below by means of exemplary embodiments with reference to the drawing. In the drawing.

DETAILED DESCRIPTION OF THE INVENTION

FIGS. 1 to 8 show a rear region 2 of a motor vehicle 1 in various views. The motor vehicle 1 has an underbody 3 which extends on the underside of the motor vehicle 1.

A rear diffuser 4 is provided on the underbody 3, wherein, together with the rear diffuser 4, the underbody 3 defines an air duct 5 along which air can flow below the motor vehicle 1 when the motor vehicle 1 is moving through the air mass of the atmosphere. In this case, essentially only the relative component of the velocity between the air and the motor vehicle 1 is relevant for this air flow, that is to say the vehicle velocity, if the typically rather low wind-related air velocities are neglected.

The air duct 5 extends at the rear of the motor vehicle 1 counter to the longitudinal direction 6 of the vehicle toward the rear end 7 of the motor vehicle 1.

The air duct 5 has at least one upper wall 8 and optionally also lateral walls, which guides or guide the air between the roadway on which the motor vehicle is traveling and the motor vehicle 1 itself. In this case, the air duct 5 can optionally also be delimited laterally in a corresponding manner by substantially vertically extending walls in order to bring about a defined flow through the air duct across the width as well. The upper wall 8 of the air duct 5 delimits the air duct 5 in the upward direction. Typically, the air duct 5 is delimited on its underside by the roadway on which the vehicle is traveling.

The upper wall 8 has a first region 9, which is coupled or fastened in a nonadjustable manner to the motor vehicle 1 and/or to the underbody 3. The upper wall 8 serves to guide the air along the air duct 5. Furthermore, the upper wall 8 has a second region 10, which can be moved relative to the motor vehicle 1 and/or to the underbody 3, that is to say can be pivoted, for example. The second region 10 extends up to the rear end 7 of the motor vehicle 1. Advantageously and optionally, the second region 10 is guided in its capacity for movement, in particular by guide means (not shown).

The second region 10 is flexibly coupled to the first region 9 by means of at least one hinge-type region 11, see also FIGS. 9 to 14.

According to the exemplary embodiment shown in FIGS. 1 to 8, the second region 10 has at least one laminar element 12. This laminar element 12 is preferably a flat or curved element, which serves to guide the air along the air duct 5.

Figure 1:
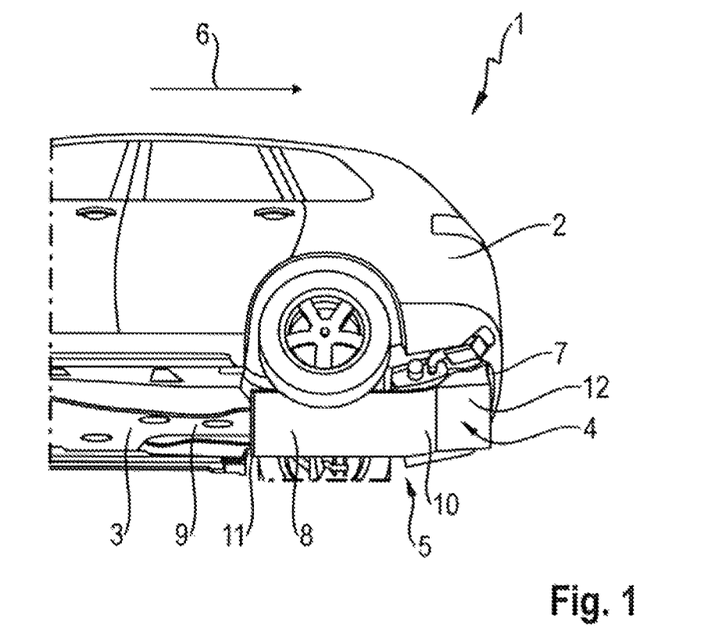
FIG. 1 shows a schematic view of a rear region of a motor vehicle with a rear diffuser in an extended second operating position.
Figure 2:
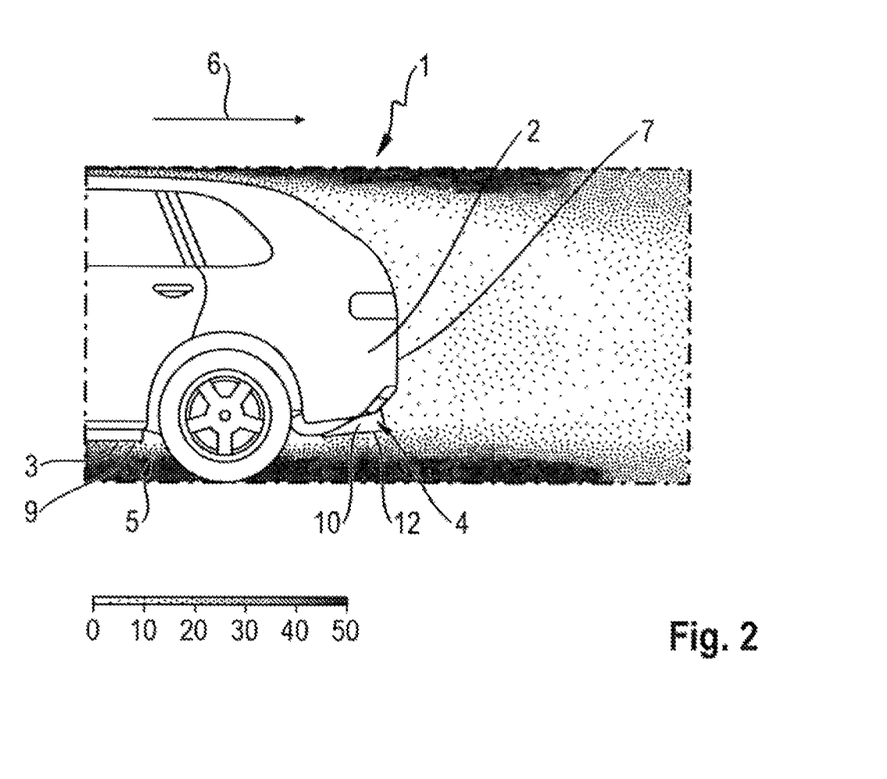
FIG. 2 shows a schematic side view of the rear region of the motor vehicle with the rear diffuser in the extended second operating position.
Figure 3:
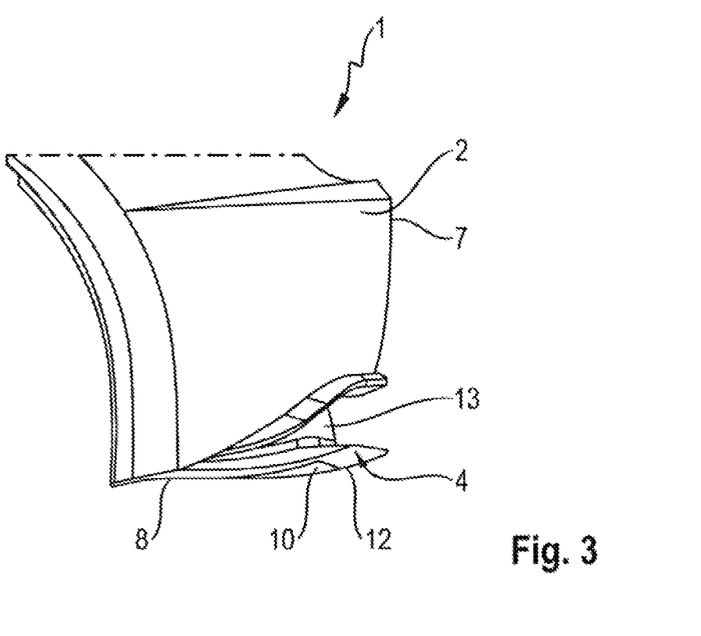
FIG. 3 shows another schematic side view of the rear region of the motor vehicle with the rear diffuser in the extended second operating position.
Figure 4:
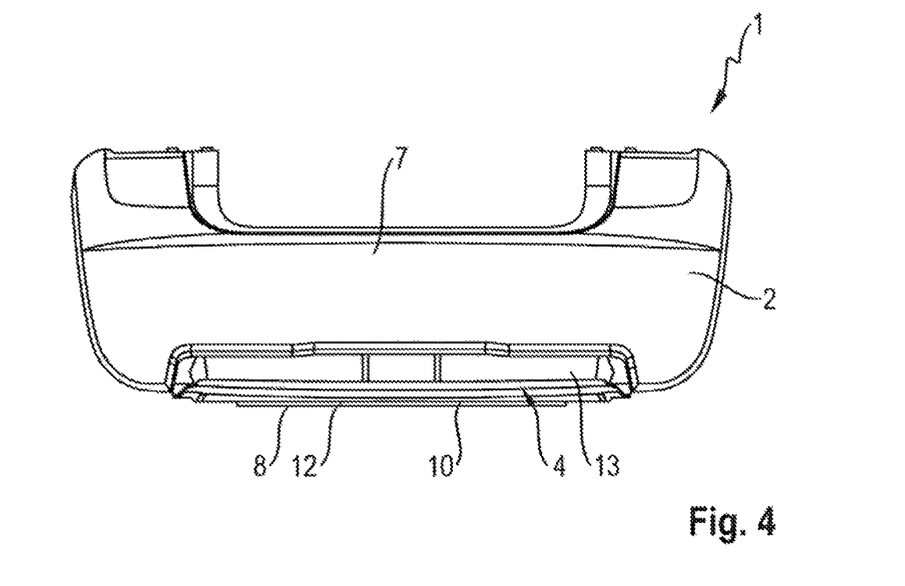
FIG. 4 shows a schematic rear view of the rear region of the motor vehicle with the rear diffuser in the extended second operating position.
Figure 5:
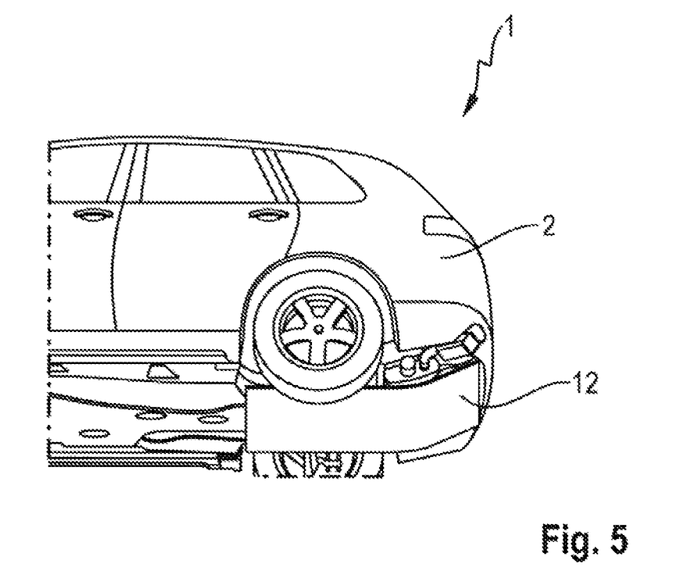
FIG. 5 shows a schematic view of the rear region of the motor vehicle with the rear diffuser in a retracted first operating position.
Figure 6:
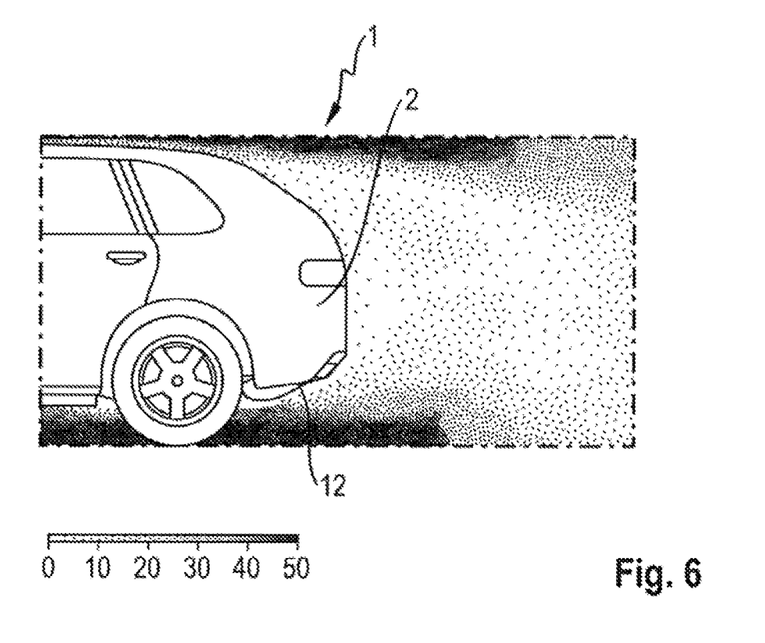
FIG. 6 shows a schematic side view of the rear region of the motor vehicle with the rear diffuser in the retracted first operating position.
Figure 7:
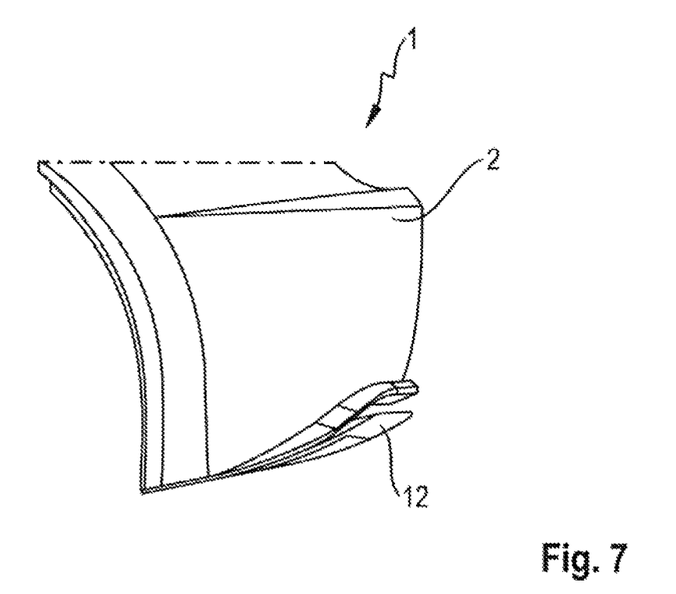
FIG. 7 shows another schematic side view of the rear region of the motor vehicle with the rear diffuser in the retracted first operating position.
Figure 8:
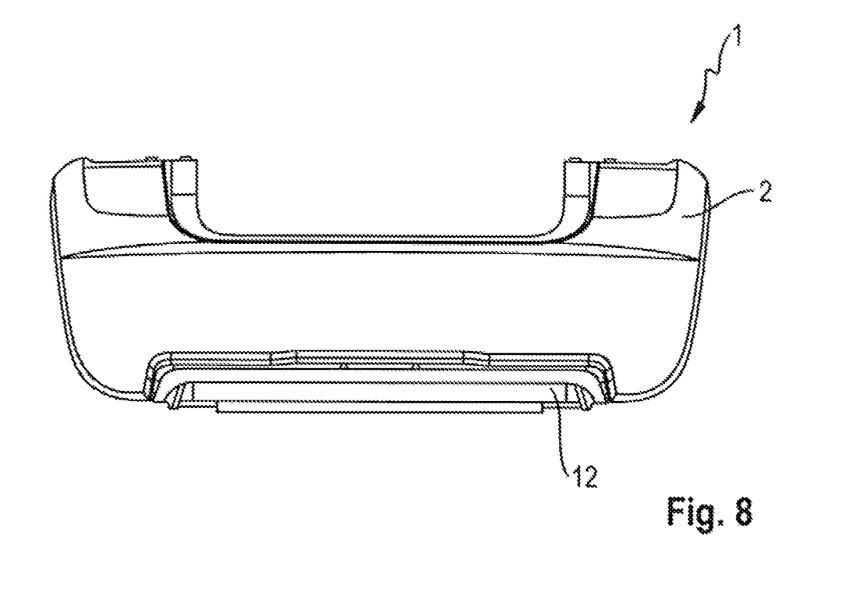
FIG. 8 shows a schematic rear view of the rear region of the motor vehicle with the rear diffuser in the retracted first operating position.

It can also be seen from FIG. 3 that the second region 10 furthermore has a wall 13 which projects from the laminar element 12 and projects upward from the laminar element 12, in particular optionally at an angle of approximately 90°.

It can also be seen that the second region 10 furthermore has a spoiler lip 14, which projects from the laminar element 12 and/or from the projecting wall 13 and projects substantially counter to the direction of travel.

FIGS. 1 to 4 show the setting of the rear diffuser 4 in a second operating position, in which the rear diffuser 4 is set in the extended second operating position. This optimizes the drag.

FIGS. 5 to 8 show the setting of the rear diffuser 4 in a first operating position, in which the rear diffuser 4 is set in the retracted first operating position. This optimizes the downforce.

The rear diffuser 4 can be adjusted between the first operating position and the second operating position, in particular it can also be adjusted into at least one intermediate position between the first operating position and the second operating position.

Figure 9:
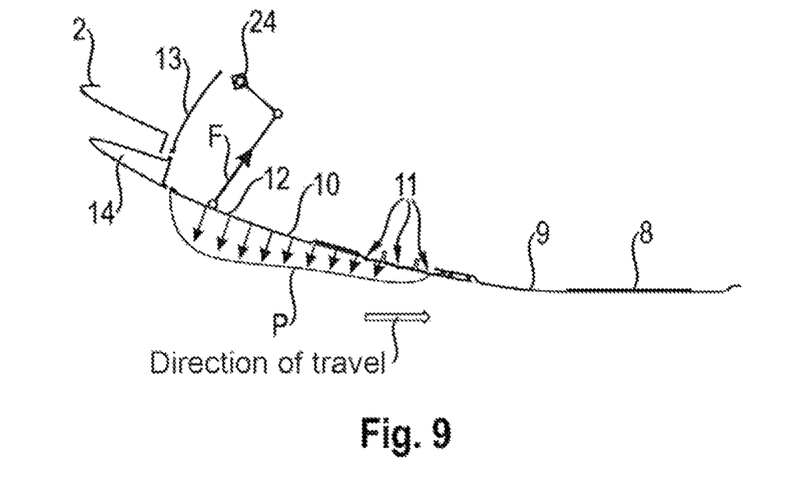
FIG. 9 shows a schematic sectional view of the rear diffuser to demonstrate one of the two operating positions.
Figure 10:
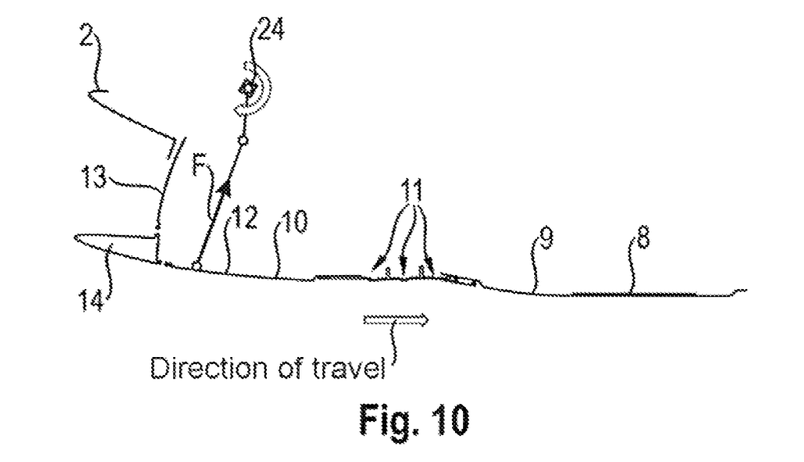
FIG. 10 shows a schematic sectional view of the rear diffuser to demonstrate the other of the two operating positions.

FIGS. 9 and 10 each show a section through the rear of the motor vehicle 1, wherein the rear diffuser 4 is shown in each case in one of the two operating positions. The laminar element 12 is shown, on the one hand, in the lower, folded-out second operating position, see FIG. 10, and in the upper, folded-in first operating position, see FIG. 9.

Figure 11:
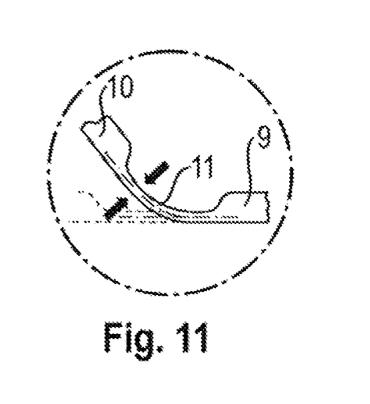
FIG. 11 shows a detail view of an exemplary embodiment of a hinge-type region of the rear diffuser.

Here, the hinge-type region 11 is shown, which extends over a defined laminar region and is not designed merely as a hinge with a single axis of rotation or hinge axis, see also the detail in FIG. 11. Thus, it is achieved that the transition from the first region 9 to the second region 10 takes place via a laminar curved or straight region, depending on the setting of the second region 10 relative to the first region 9.

FIGS. 9 and 10 also show that the laminar element 12 of the second region 10 can be adjusted by means of an actuator 24 between a retracted, raised first operating position and an extended, lowered second operating position. The actuator 24 can be driven by electric motor, pneumatically or in some other way.

Figure 12:
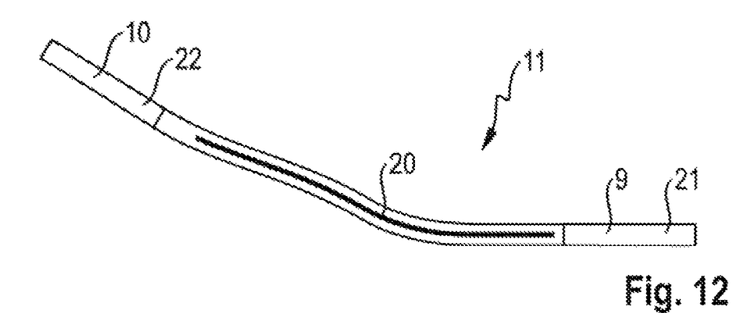
FIG. 12 shows a detail view of an exemplary embodiment of a hinge-type region of the rear diffuser in the retracted first operating position.
Figure 13:
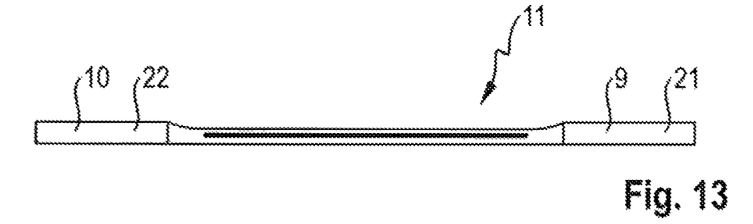
FIG. 13 shows a detail view of the exemplary embodiment of FIG. 12 of the hinge-type region of the rear diffuser in the extended second operating position.

FIGS. 12 and 13 show an illustrative exemplary embodiment of a hinge-type region 11, which is arranged and formed between the first region 9 and the second region 10. Here, FIG. 12 shows the first operating position of the rear diffuser 4 and FIG. 13 shows the second operating position of the rear diffuser 4.

In FIGS. 12 and 13, the hinge-type region 11 is formed by a flexible surface element 20, which connects the first region 9 to the second region 10. In this case, a rigidly formed laminar element 21 of the first region 9 is connected to a rigidly formed laminar element 22 of the second region 10 by means of the flexible surface element 20.

By way of example, the flexible surface element 20 is preferably formed as films or a mat made of a rubber material or of an elastomer material. In one exemplary embodiment, there may also be a reinforcement, of plastic and/or metal for example, which is connected to the rubber material or the elastomer material or is embedded therein.

Figure 14:
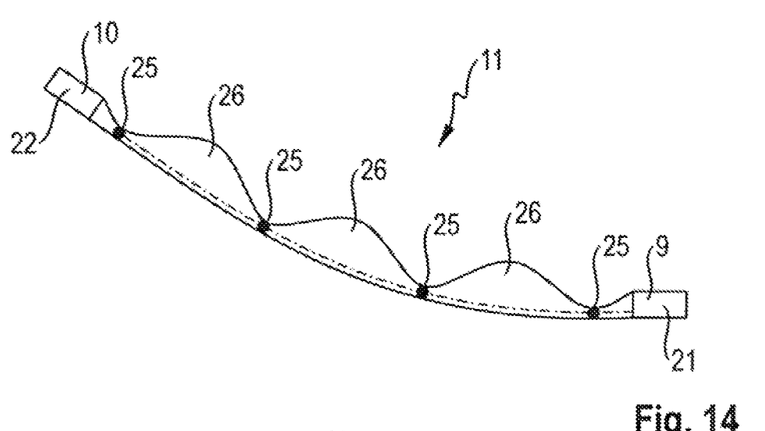
FIG. 14 shows a detail view of another exemplary embodiment of a hinge-type region of the rear diffuser in the retracted first operating position.
Figure 15:
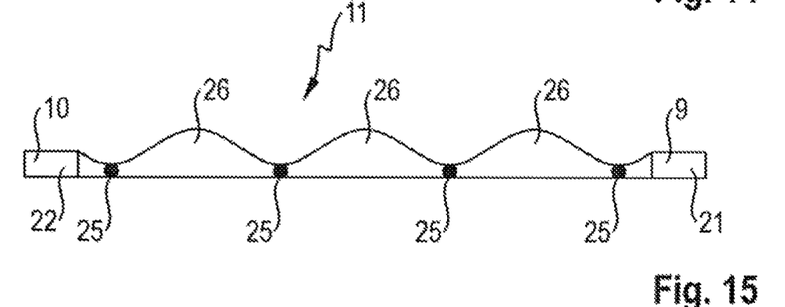
FIG. 15 shows a detail view of the exemplary embodiment in FIG. 14 of the hinge-type region of the rear diffuser in the extended second operating position.

In FIGS. 14 and 15, the hinge-type region 11 is formed by a plurality of hinges 25 which, with the interposition of respective intermediate elements 26, connect the first region 9 to the second region 10, wherein the hinges 25, together with the intermediate elements 26, are arranged in a chain arrangement with respect to one another. In this case, a rigidly formed laminar element 21 of the first region 9 is connected to a rigidly formed laminar element 22 of the second region 10 by the arrangement of the hinges 25 and of the intermediate elements 26.

Here, in one exemplary embodiment, a first intermediate element 26 is connected in an articulated manner to the first region 9 by means of a first hinge 25, and the second region 10 is connected in an articulated manner to the first intermediate element 26 or to a second intermediate element 26 by means of a second hinge 25, wherein at least one third hinge 25 and/or at least one third hinge 25, at least one third intermediate element 26 and at least one fourth hinge 25 are/is optionally arranged between the first intermediate element 26 and the second intermediate element 26. It is thereby possible to form a chain of intermediate elements 26 with hinges 25. The intermediate elements 26 are rigid bodies, in particular rigid laminar bodies.

In the exemplary embodiment shown, four hinges 25 with three intermediate elements 26 are shown in order to form the hinge-type region 11. Alternatively, it is also possible for just two hinges 25 with one intermediate element 26 to be provided between the first region 9 and the second region 10, or for some other number n of intermediate elements 26 with a number n+1 of hinges to be provided, which connect the first region 9 to the second region 10, wherein n is an element of the natural numbers, i.e. in particular n=1, 2, 3, 4, 5, 6, 7, 8, 9 or 10 or more.

By way of example, the intermediate elements 26 shown are elongate laminar elements which extend transversely to the direction of travel of the motor vehicle 1 and exhibit an approximately trapezoidal section.

The hinge-type region 11 is thus a hinge-type laminar region, as shown by the exemplary embodiments.

LIST OF REFERENCE SIGNS 1 motor vehicle
2 rear region
3 underbody
4 rear diffuser
5 air duct
6 longitudinal direction of the vehicle
7 rear end
8 upper wall
9 first region
10 second region
11 hinge-type region
12 laminar element
13 wall
14 spoiler lip
20 flexible surface element
21 laminar element
22 laminar element
24 actuator
25 hinge
26 intermediate element

What is claimed is:

1. A rear diffuser for an underbody of a motor vehicle, said rear diffuser comprising:
    an air duct at a rear end of the motor vehicle, wherein the air duct has at least one upper wall that delimits the air duct in an upward direction,
    wherein the upper wall has a first region that is coupled in a nonadjustable manner to the motor vehicle and/or to the underbody,
    wherein the upper wall has a second region that is configured to be moved relative to the motor vehicle and/or to the underbody,
    wherein the second region is coupled in a movable manner to the first region by at least one hinge, and
    wherein the at least one hinge comprises a plurality of hinges which, with the interposition of respective intermediate elements, connect the first region to the second region, and wherein the hinges are arranged in a chain arrangement with respect to one another.

2. The rear diffuser as claimed in claim 1, wherein the second region extends toward the rear end of the motor vehicle and has at least one laminar element.

3. The rear diffuser as claimed in claim 2, wherein the second region further comprises a projecting wall that projects from the laminar element and projects upward from the laminar element.

4. The rear diffuser as claimed in claim 3, wherein the second region further comprises a spoiler lip that projects from the laminar element and/or from the projecting wall and projects substantially counter to a direction of travel.

5. The rear diffuser as claimed in claim 2, wherein the laminar element of the second region is configured to be adjusted by an actuator between a retracted, raised operating position and an extended, lowered operating position.

6. The rear diffuser as claimed in claim 1, wherein the at least one hinge is formed by a flexible surface element, which connects the first region to the second region.

7. The rear diffuser as claimed in claim 6, wherein the flexible surface element is a film or a mat that is composed of a rubber or elastomer material.

8. The rear diffuser as claimed in claim 1, wherein the hinge is formed by a flexible surface element, which connects a rigidly formed laminar element of the first region to a rigidly formed laminar element of the second region.

9. The rear diffuser as claimed in claim 1, wherein the air duct extends counter to a longitudinal direction of the vehicle toward the rear end of the motor vehicle.

10. A motor vehicle having a rear diffuser as claimed in claim 1.

11. A rear diffuser for an underbody of a motor vehicle, said rear diffuser comprising:
- an air duct at a rear end of the motor vehicle, wherein the air duct has at least one upper wall that delimits the air duct in an upward direction,
- wherein the upper wall has a first region that is coupled in a nonadjustable manner to the motor vehicle and/or to the underbody,
- wherein the upper wall has a second region that is configured to be moved relative to the motor vehicle and/or to the underbody,
- wherein the second region is coupled in a movable manner to the first region by at least one hinge, and
- wherein a first intermediate element is connected in an articulated manner to the first region by a first hinge, and the second region is connected in an articulated manner to the first intermediate element or to a second intermediate element by a second hinge, wherein at least one third hinge, at least one third intermediate element and/or at least one fourth hinge are/is arranged between the first intermediate element and the second intermediate element.

* * * * *